United States Patent [19]
Lu et al.

[11] Patent Number: 6,035,336
[45] Date of Patent: Mar. 7, 2000

[54] AUDIO TICKER SYSTEM AND METHOD FOR PRESENTING PUSH INFORMATION INCLUDING PRE-RECORDED AUDIO

[75] Inventors: Qi Lu, San Jose; Lev Stesin, San Francisco, both of Calif.

[73] Assignee: International Business Machines Corporation, Armonk, N.Y.

[21] Appl. No.: 08/953,167

[22] Filed: Oct. 17, 1997

[51] Int. Cl.[7] .................................................. G06F 13/00
[52] U.S. Cl. ......................... 709/232; 709/229; 345/339
[58] Field of Search .................. 395/200.33, 200.59, 395/200.54, 200.69; 345/339; 702/3; 709/229, 224, 239, 232, 231

[56] References Cited

U.S. PATENT DOCUMENTS

| | | | |
|---|---|---|---|
| 4,920,432 | 4/1990 | Eggers et al. | 386/96 |
| 5,270,922 | 12/1993 | Higgins | 364/408 |
| 5,374,952 | 12/1994 | Flohr | 348/7 |
| 5,414,455 | 5/1995 | Hooper et al. | 348/7 |
| 5,557,663 | 9/1996 | Huang et al. | 379/110 |
| 5,630,066 | 5/1997 | Gosling | 395/200.51 |
| 5,640,590 | 6/1997 | Luther | 395/806 |
| 5,787,470 | 7/1998 | DeSimone et al. | 711/124 |
| 5,802,526 | 9/1998 | Fawcett et al. | 707/104 |
| 5,826,242 | 10/1998 | Montulli | 705/27 |
| 5,848,378 | 12/1998 | Shelton et al. | 702/3 |
| 5,850,218 | 12/1998 | LaJoie et al. | 348/12 |
| 5,884,056 | 3/1999 | Steele | 345/339 |

*Primary Examiner*—Zarni Maung
*Attorney, Agent, or Firm*—James C. Pintner; Gunster, Yoakley, Valdes-Fauli & Stewart

[57] ABSTRACT

For use with client/server or network communication and processing systems, such as the Internet, a "push" information system is provided, for automatically providing information to a user. The information is provided in audio form. The system includes a library of prerecorded sounds, including a dictionary of words and phrases. When information appears, for instance in text format, a mapper produces a sequence of audio clips from the library, to convey information substantially identical to that in the information. This sequence of audio clips is played at the user's terminal. Thus the user is exposed to the information, while the user continues to use an application on the terminal. The information does not require screen real estate, and the user need not look away from his/her work in order to receive the information.

48 Claims, 6 Drawing Sheets

AUDIO TICKER SYSTEM AND METHOD FOR PRESENTING PUSH INFORMATION INCLUDING PRE-RECORDED AUDIO

FIELD OF THE INVENTION

The invention generally relates to the field of computer communication systems in client-server architectures. More specifically, the invention relates to providing a user with desired, remotely-stored information. The invention has particular applicability to the World Wide Web.

BACKGROUND OF THE INVENTION

The Internet, and its multimedia counterpart, the World Wide Web, have become a popular medium of communication. Information on a wide variety of topics is available with just a few clicks of a mouse. As the Internet expands its boundaries by increasing the number of servers and networks which it supports, and as more and more people utilize the Internet to search for data, the way in which information is presented is undergoing evolution. Two important evolutionary factors, which have become increasingly apparent, are discussed herein.

THE FIRST FACTOR—"PUSH" TECHNOLOGY

The first important evolutionary factor is that the burden of obtaining information desired by a user no longer falls squarely on the shoulders of the user. Rather, an active technology, called "Push" technology, is making it possible for the system to provide the user with desired information automatically, as information, defined by a class of criteria as being "desired," becomes available. Push technology has been pioneered by PointCast, Inc., in Sunnyvale, Calif.

For example, automated agent machines, such as "web crawlers", search the Web for data collection, indexing and filtering. As another example, a single access to a server might be made by a "proxy server", which then saves the content and re-distributes it to a user community.

Also, push technology has been explored, with particular reference to issues relating to providing compensation to content providers, on co-pending, co-assigned United States Patent Application 08/819,345, filed Mar. 18, 1997, Lotspiech et al., "Persona-Based Client/Server Communications." The disclosed invention provides a system and method for client/server communications on the World Wide Web, which represents one possible approach for allowing the user to control information that is revealed to a server and that is delivered from a server.

A client system is communicatively coupled to a server. User information about a user on the client system is stored on the client system. A user information request is received from the server. The requested user information is compared with the stored user information, at the client. User information is transmitted from the client to the server based on the comparison between the requested user information and the stored user information. Information is received from the server that is based on the user information transmitted from the client to the server.

The PointCast and Lotspiech systems have used Push technology to make desired information available to users. However, the user then faces the prospect of being overwhelmed by the volume of information received.

THE SECOND FACTOR—HIGHLIGHTS

The second important evolutionary factor is that the explosive growth of the amount of information available in cyberspace makes presenting highlights a more valuable approach.

A user interface technology, commonly called "Ticker" technology, has recently emerged as one of the dominant user interfaces, used by Internet information systems, for displaying dynamically changing data.

"Ticker" is a metaphor, referring to the old-style hardcopy stock tickers which printed information, such as stock quotes and news bulletins, on a thin strip of paper tape. In a graphical user interface (GUI), the ticker manifests itself as a strip, typically along the bottom of a GUI display, within which information is displayed. Text either runs, or "crawls," horizontally along the length of the ticker display strip, or rolls vertically, in the fashion of a line of just-typewritten text coming into view as the platen of a typewriter rolls upward one line.

Conventional visual and text-based ticker interfaces have had many drawbacks. First, one must always pay close attention to the ticker's display, or otherwise he/she has no way of getting the information content.

Second, a ticker requires a display device with sufficient capabilities to realize its value. This means that it is not appropriate for devices with very limited displaying capabilities such as a mobile phone. A ticker, however small and compact it is, occupies some screen space that could otherwise be used by other applications. For example, a user filling out a financial spreadsheet must constantly close an application window in order to see the ticker's content.

Third, the visual display ties up user's eye sights thus diverting one's attention from performing some other important tasks. Finally, one has to be near the screen to get the information.

Therefore, there is an unfilled need for a method and system, usable in client/server or remote networked systems such as the Internet, for making desired information available to the user in a way that the user is optimally able to receive the information without being unduly distracted from his/her work.

SUMMARY OF THE INVENTION

It is therefore an object of the invention to provide desired information to a user in a way which is less distracting to the user than conventional ways are.

It is a further object of the invention to provide the desired information to a user in a way which requires less video display real estate than conventional ways are.

To achieve these and other objects, there is provided, in accordance with the invention, a system, for use with an information processing system which is coupled to an information source, for providing a user of the information processing system with desired information while the user is otherwise occupied using the information processing system.

The system of the invention comprises the following components:

A user interface unit is provided, the unit including a video display mechanism and an audio play mechanism.

Means are provided for displaying first information, using the video display mechanism, responsive to user commands for accessing the first information. This generally includes a known computer graphical user interface (GUI) system, having a pixel display, such as a video display, for displaying the familiar GUI paradigm of a desktop, icons representing user-selectable application programs, and windows representing active application programs and including functional features usable by the user through manipulation of a keyboard and of a mouse or other pointing device.

Finally, in accordance with the invention, means are provided for playing second information, responsive to a predetermined system condition, using the audio play mechanism.

Advantages of the system and method according to the invention will be evident from the detailed description which follows. First, since most of the functionality of the system remains within the GUI, audio information played for the user, in accordance with the invention, does not take up "bandwidth" of the user's visual perception. Rather, the user's hearing, which is conventionally utilized less fully than the user's vision, is available for absorbing the information in audio form. Thus, information conveyed by a system according to the invention does not monopolize the user's attention from his/her work at hand. Also, the information conveyed does not require display screen real estate.

It is believed that the system according to the invention is inexpensive to implement on conventional GUI computer systems, and can be an easy add-on to existing systems.

While the invention is primarily disclosed as a system, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

In accordance with the invention, information is automatically provided, in audio form, to a user. The description which follows will include a description of the environment in which the invention is to be used, the system architecture of a server supporting the invention and a client system for allowing a user to utilize the invention, and a procedure for allowing the user to request the service and specify the sort of information which is desired.

THE ENVIRONMENT OF THE INVENTION

Figure 1:
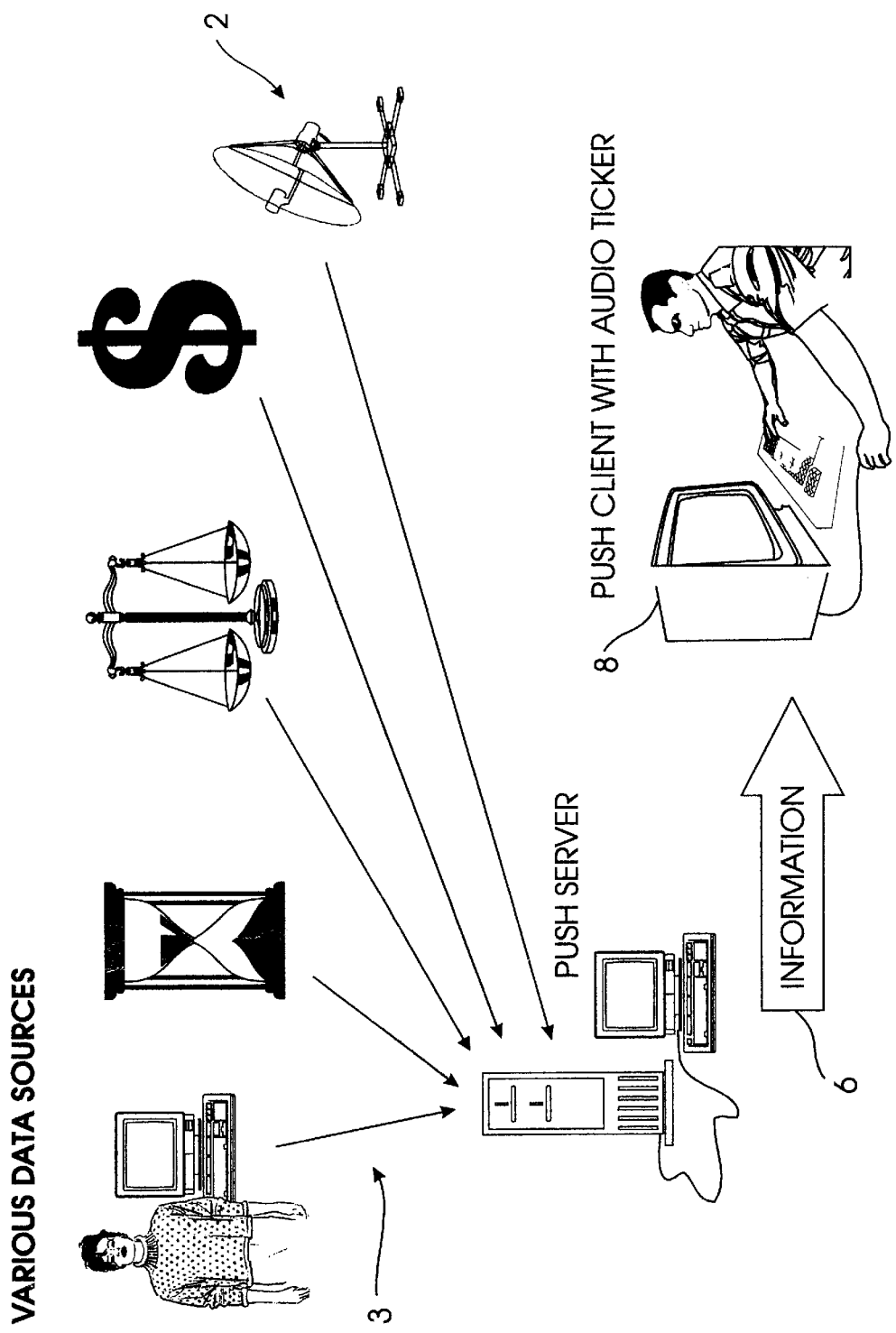
FIG. 1 is a diagram of an environment in which the invention is advantageously employed.

FIG. 1 is a diagram, showing an environment in which the invention is advantageously practiced. Various sources of information are shown collectively as 2. The information sources may include a remote information processing system, a time clock, an on-line database of information such as legal information or financial information, broadcast radio or television signals, etc.

A communication network 3 couples the information from the information sources 2 to a push server 4. Many noteworthy aspects of the invention are preferably embodied within the push server 4, and its structure and function will be described in detail below.

The push server 4 processes the information, and produces formatted information 6, which is provided to a user at an information processing system 8 which serves as a push client. In accordance with the invention, the formatted information 6 is formatted as audio information, such as a sequence of pre-recorded voice clips chosen from a library, based on the information coupled to the push server 4.

The push server 4 distributes the information among registered clients (one or more users at information processing systems 8) according to their requests. The process by which a user subscribes to the service will be described in detail below.

THE USE OF INFORMATION TOKENS: FIRST EMBODIMENT—FIG. 2

In accordance with the invention, information is quantified in the form of "tokens," or discrete units, and the push client 8 receives information consisting of sets of the tokens. Here, the term "token" is taken as broadly meaning data in any suitable form, packetized or otherwise, for storage and/or transmission. The nature of the tokens is dependent on the type of information being provided, and numerous different types, which would be understood by persons skilled in the art, fall within the spirit and scope of the invention. Preferred implementations of the invention accommodate such token formats as are already in existence and in use with existing systems.

Figure 2:
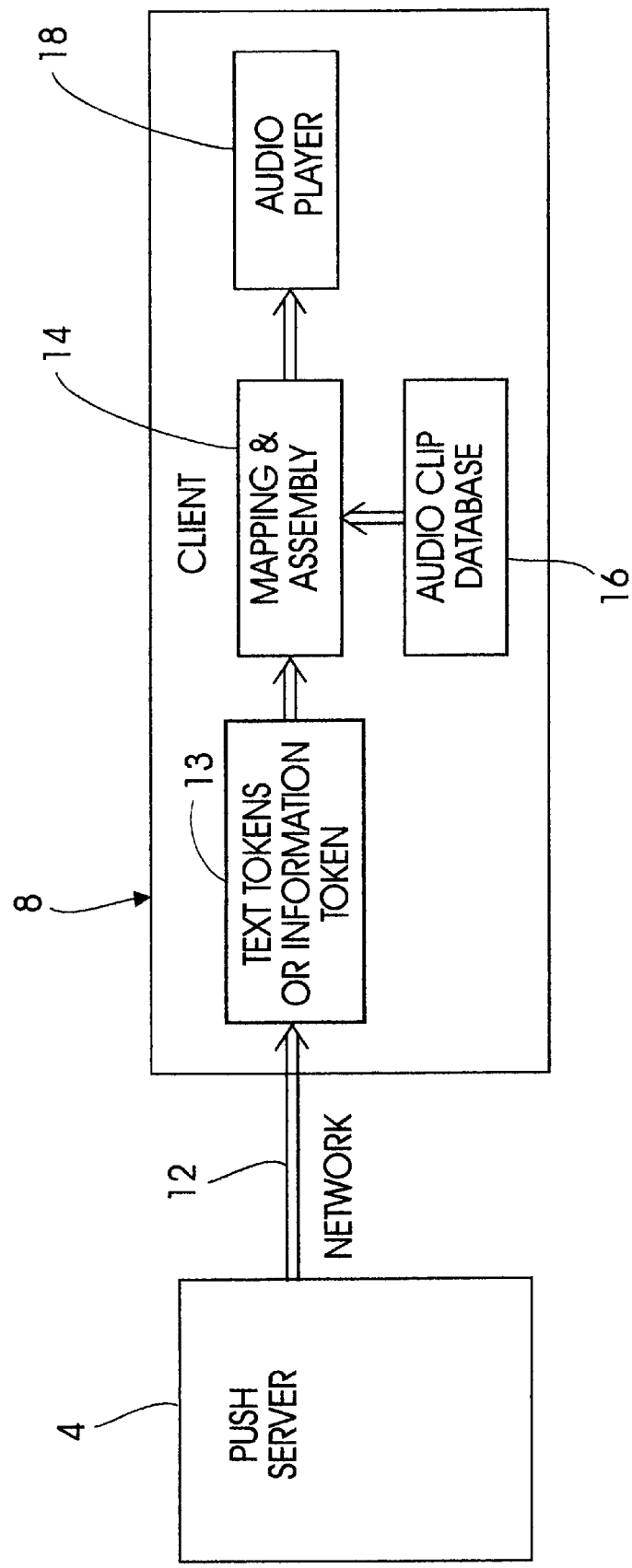
FIG. 2 is a high-level block diagram, showing the architecture of a system according to the invention.

FIG. 2 is a diagram showing the sequence, within the environment of the invention, whereby information tokens are provided to the user. When a system according to the invention provides information to a user, the information goes through a mapping process, which will be explained in detail below.

While some or all of the functionality of the mapping process can reside at the server 4, the mapping process preferably is performed at the push client 8, for two reasons. In general, the mapping process maps received tokens (relatively small-size data packets) to audio clips (relatively large data objects). Transmission throughput, then, is optimized by doing the greatest possible amount of transmission using the tokens, and keeping the need for transmission of audio clips to a minimum.

The second reason for preferably keeping the mapping function at the client 8 is that information resources, in the form of a library of audio clips, are maintained at the venue where the mapping takes place. If the mapping takes place at the user's client system 8, the required on-site information resources may be kept small, to accommodate only the needs of that particular user.

Information originates in a repository, or from a remote source such as a news service, a stock exchange, etc. It is contemplated that the information is dynamically updated over time, and new information updates are provided to the server 4 at random times. Some of these new information updates will be considered likely to be of interest to users. Accordingly, means are provided for noting changes to the stored information, new incoming information, etc. Responsive to these changes, the new information is made available by the server 4 as an information token.

The new information is made available, preferably over a link 12 to the client 8. The information, received in the form of tokens 13, is provided to a mapper 14. The mapper 14 includes, or operates cooperatively with, a library 16 of clips of information, in a format suitable for use by the client 8. The library 16 is also preferably resident within the push client 8, but may alternatively include an external database, file system, etc.

In accordance with the invention, the library 16 includes audio clips. The audio clips are preferably such as can be assembled in a sequence to convey the meaning of the information to the user, through an audio player 18. In one preferred embodiment, the library 16 includes a dictionary of audio clips of individual spoken words. Alternatively, phrases may also be included. Where the information is likely to relate to a specialized area of subject matter, audio clips of phrases relating to that subject matter are particularly advantageous.

In many foreseeable applications of the invention, the information dealt with is limited in its vocabulary. The vast majority of push channels are dealing with such subjects as stock prices, traffic reports, weather conditions, sports scores, etc. For all these areas of interest, a limited vocabulary can be designed so as to facilitate the translation from any text containing information to that subject matter to the sequence of predefined sounds.

The mapper 14 parses the information within the token, and identifies individual words, phrases, etc. By referencing the audio clip database 16, the mapper 14 accesses corresponding pre-recorded audio clips for the tokens. The mapper 14 then assembles these clips into a cohesive structure. While a skeleton structure of key words may be sufficient to convey the meaning of the information item, additional processing may be employed to produce linguistically correct and natural sentences.

Note that a speech synthesizer, which generates voice from text, may be used in place of an audio clip library. However, it is believed that, because of the relatively low level of maturity in present-day speech synthesis technology, of the difficulty in generating synthesized voice with natural sounding tone, inflections, etc., and of the advantages of using audio clips for specialized areas of vocabulary, audio clip libraries are deemed to be the preferred mode of operation of the invention.

SECOND EMBODIMENT—FIGS. 3 AND 4

Next, a detailed description of a second preferred system architecture, and of the operation responsive to receipt of a new information item, will be given.

Figure 3:
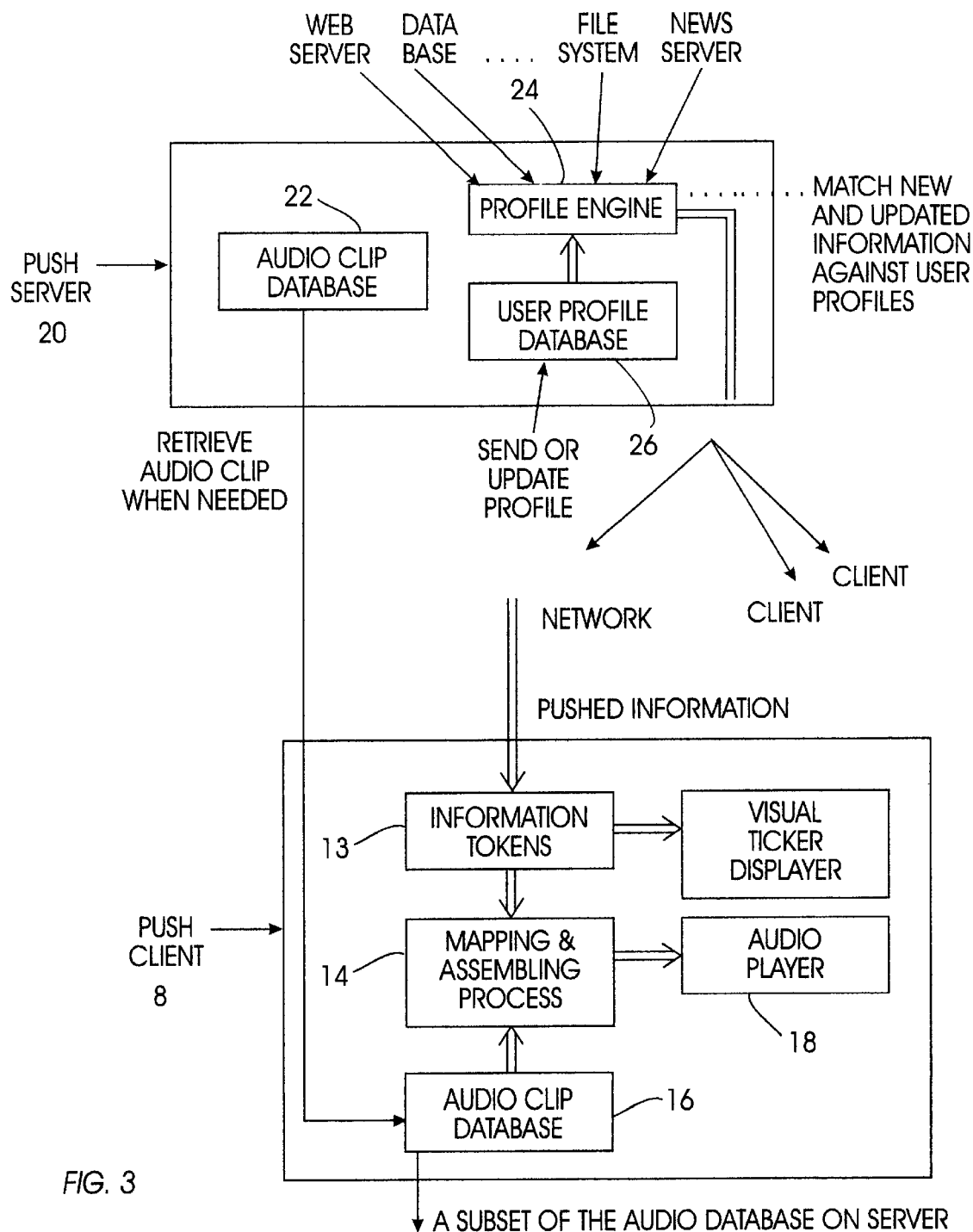
FIG. 3 is a more detailed block diagram, showing additional details of a system according to the invention, particularly with reference to the process of distributing new information to users.

FIG. 3 is a block diagram of a system including a client 8, substantially as given in FIG. 2, and a server 20, having functionality in addition to that described in connection with the embodiment of FIG. 2.

Again, the preferred location for most of the functionality is in the server 8. However, additional capability is provided in the server 20, for situations in which the mapper 14 is unable to map a portion of the information item to any audio clips existing in the clip library 16, residing on the client 8.

Where a portion of the text in a token cannot be mapped to any audio clip in the database 16, it is possible simply to omit that part of the text from the audio sequence, or to insert an audio warning indicating that a portion of the message is missing from the audio sequence. However, preferred embodiments of the invention provide ways for dealing with such situations.

An additional audio clip database 22 is provided at the server 20. It is anticipated that the database 22 will be more comprehensive than those found in the clients, such as the database 16 in the client 8. Thus, where the client 8 fails to match a portion of the token with its own audio clips, it sends a message back to the server 20, requesting a consultation with the database 22. If the database 22 contains a matching audio clip, it sends that audio clip to the client 8. While this solution has the drawback that a fairly sizeable audio clip is sent between the server 20 and the client 8, it is anticipated that this will not need to happen very frequently.

Yet another possible solution is to provide the client 8 or the server 20 with a thesaurus database, which contains synonyms for words, and sets of equivalent phrases. Thus, if a word or phrase cannot be matched up with a literally equivalent audio clip, it may nevertheless be matched up with an audio clip for a synonym or equivalent phrase.

Additional functionality is shown in the server 20, including a profile engine 24 and a user profile database 26. These will be discussed in connection with FIGS. 5 and 6, below.

PREFERRED FUNCTIONALITY—FIG. 4

Figure 4:
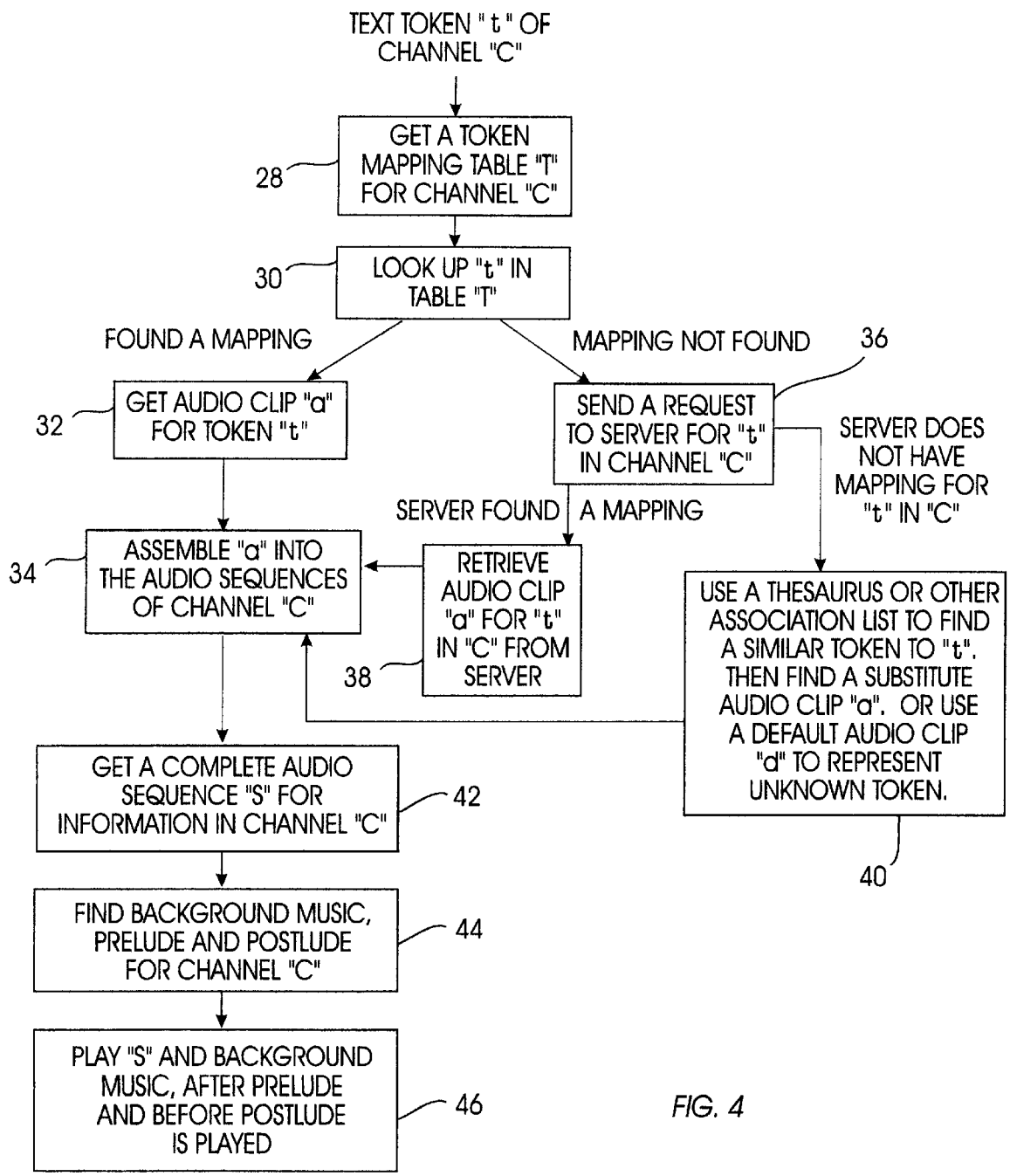
FIG. 4 is a flowchart showing operation of the system of FIG. 3.

FIG. 4 is a flowchart showing the preferred operation of the system of FIG. 3. Initially, some of the terminology used in FIG. 4 will be defined.

"Channel C": an information source, generally characterized in terms of content. For instance, one channel might be stock market information, while another channel might be sporting event results. User preferences as to desired information will be expressed in terms of channels of information.

"Token t": a unit of information, associated with a particular channel, and deemed of interest to the user.

"Table T": a table, used in the mapping process, which contains audio clips, and which uses a suitable indexing or addressing scheme for allowing the mapper 14 to access an appropriate audio clip for a parsed word or phrase from the token.

"Audio Clip a": an audio clip from within the table T, corresponding with part of the content of the token t.

"Audio Sequence S": a sequence of audio clips, assembled from the clips in the table T, for correspondence with the content of a token t.

Referring now to FIG. 4, the process executed by a system according to the invention will be described in detail.

The input is a token t, such as a text token, provided from channel C.

First, a token mapping table is accessed (steps 28, 30). the table is essentially equivalent to the database 16 of FIG. 3, but is specific to the subject matter likely to arise in messages from channel C. It will be understood, then, that the client 8 also includes other similar tables for other channels.

If a match for a word or phrase in the token t is found in the table T, then processing proceeds to steps 32 and 34, in which an audio clip is accessed from the table T, and used to build an audio sequence.

If step 30 failed to find a match, then, in the preferred embodiment of FIG. 3, a request for a consultation with the database 22 is made (step 36). If a matching clip is found there, then step 38 retrieves the matching clip, and sends it back to the client 8. Processing passes to step 34, where the clip is used in the building of the audio sequence.

If step 36 also fails to find a match, then a suitable response is sent back to the client 8. The client 8 either consults a thesaurus, or uses a default "unknown" audio clip (step 40).

The processing up through step 34 is executed iteratively, for tokens containing a sequence of segmentable words or phrases. When the last word or phrase is processed, the final result of step 36 is a completed audio sequence S (step 42).

Optionally, prelude and postlude sounds, such as fanfares, chimes, etc., are added, and background sound, such as music, is superimposed (step 44). Finally, in step 46, the entire audio sequence is played back through a suitable audio system in, or coupled to, the client system 8.

USER PREFERENCE CONFIGURATION—FIGS. 5 AND 6

Next, a discussion will be provided of the process of configuring the system for a given user's preferences and interests.

Figure 5:
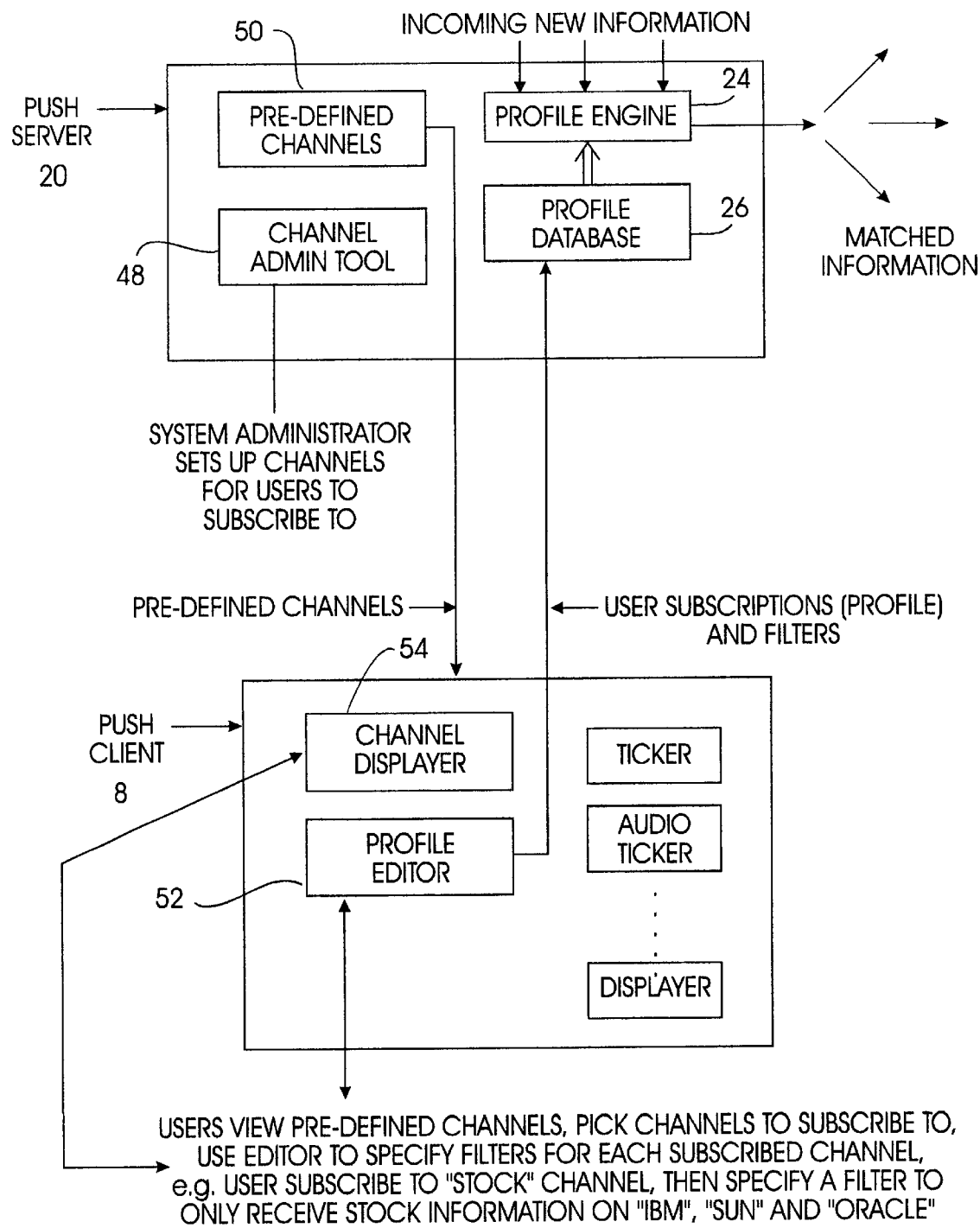
FIG. 5 is a more detailed block diagram, showing additional details of a system according to the invention, particularly with reference to the process of determining which information is to be provided to which users.

In the block diagram of FIG. 5, the server 20 and the client 8, substantially as per those of FIG. 3, are shown.

As discussed above, sources of various particular types of subject matter are referred to as "channels." Thus, a user will express his/her desired information by specifying channels.

In FIG. 5, the server 20 includes a channel administration tool 48, which operates, in conjunction with a user's input, to subscribe a user to a desired channel. The server 20 also includes a library 50 of channels to which a given user has already subscribed. When a user adds or deletes a subscribed channel (by means of a process to be described below), the administrator 48 makes suitable changes to the entries in the library 50.

The client 8 includes means for providing a user interface that allows the user to make channel selections. Preferably, the means includes a profile editor 52, which displays a menu 54 of possible channels, including an indication of which channels are currently subscribed to. Since the information about available channels and channels currently subscribed to is typically resident on the server 20, the means further includes a communication arrangement for allowing the profile editor 52 to access and update the library 50 of pre-defined channels. It will be understood that consistency is required between the record of subscribed channels in the library 50 and the information 54 displayed at the client.

Also in accordance with the invention, a further refinement in the user's ability to specify desired information is preferably provided. This further refinement is called "filtering."

The user filters desired information by specifying subsets of the information within a given channel which is desired. For a channel devoted to stock market information, the user can filter the information by subscribing only for information about IBM Corp. stock. For a channel devoted to sports information, the user can filter the information by subscribing only for information about baseball, or more specifically for information about the Cleveland Indians.

The mechanisms by which desired channel information is identified, and by which particular filtered information within a given channel is identified, are not necessarily identical. Channel information is likely to be easily identifiable by the server 20 because of its transmission point of origin, or because of a header on the token, the header identifying the origin of the token, or giving information that classifies the token's content.

Where more specific filtering of information is to be performed, a more elaborate test may be required. For instance, where Cleveland Indians information is to be filtered out of information from a sports channel, the system identifies the information by its channel as being sports information, and then runs a content check, for instance by using "Cleveland Indians" as a keyword or keyphrase. Information from the sports channel that contains this keyphrase is considered as having been identified by the filtering.

Where less specific filtering of information is to be performed, the test may be modified to include a set of keywords or keyphrases. That is, where the more general category of baseball information is to be filtered out of a sports channel, a set of keyphrases might include {baseball, spring training, World Series, Little League, Minor League} or other related terms. An information item containing any one of these keyphrases would satisfy the filtering, and be provided to the user.

Figure 6:
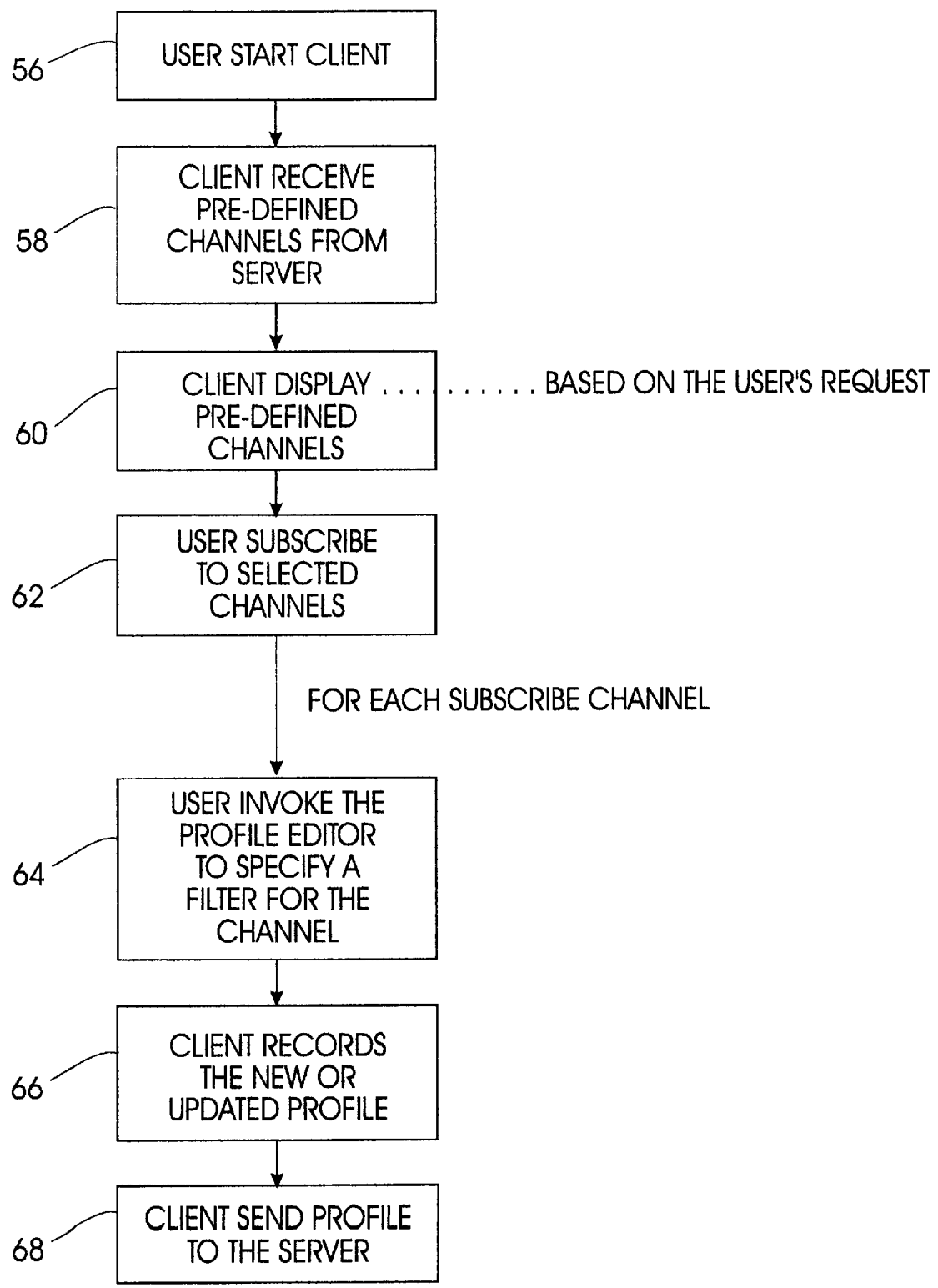
FIG. 6 is a flowchart showing operation of the system of FIG. 5.

FIG. 6 is a flowchart showing a process by which a user, operating the client 8, changes the user's desired information. In step 56, the user operates the client 8 by entering a command to invoke the profile editor 52. a suitable user interface, such as an application window, opens on the client 8's display. Also, a message is sent to the server 20, requesting a download of the user's current desired information from the library 50 of pre-defined, subscribed information.

The client 8 receives this information (step 58) and displays it to the user, through the client 8's user interface (step 60).

The user then subscribes (step 62) to new channels, in which he/she is interested, or deletes channels which had been subscribed to, but which are no longer of interest. Preferably, the user interface supports a convenient, userintuitive way of doing this. For instance, a menu of channels is listed, and a user clicks a mouse on one of the channels to subscribe to it. A channel already subscribed to is marked accordingly, such as by an adjacent checkmark or other symbol. When the user clicks on a channel already subscribed to, the subscription symbol disappears, indicating that the channel is no longer to be subscribed to.

The profile editor 52 also provides the user with the ability to specify a filter associated with a subscribed channel. This functionality is invoked (step 64) in a suitable manner, such as by selecting a subscribed channel and clicking on a "filter definition" button.

As discussed above, a filter is preferably defined in terms of a set of one or more keywords or keyphrases. Initially, the system displays any filter already in existence for the channel. Preferably, the defined filter is given in an edit window, or the like, so that the user can edit the filter as desired.

Optionally, the channel menu may contain a default filter, or a list of suggested keywords and keyphrases, associated with a given channel. A user, selecting that channel, may invoke the default filter or select keywords or keyphrases from the list, as well as type in his/her own desired keywords or keyphrases. The editor may also include a spell checker for the keywords, or a "wildcard" capability, so that a user can type in the root of a desired keyword, and use the wildcard to catch all possible inflections, suffixes, or variations on that root.

Also, the filter may be specified in terms of more sophisticated logical combinations of keywords, as are commonly used with other keyword-based search engines. Examples are "a and (B or C)", "D and not (E)", "F (adjacent to) G," "H (within (a specified number of words) of) I," etc.

When the user has completed the desired subscriptions and filters, he/she indicates completion (step 66), such as by clicking on an Enter button in the user interface. The information entered, including all changes, is then sent (step 68) back to the server 20, for entry into the library 50 of subscribed channels and filters. Thereafter, that information is used to identify information items to be sent to the client 8.

USER INTERFACE FEATURES RELATING TO SOUND PLAYBACK

1. SOUND PLAYBACK FEATURES

In addition to those aspects of the user interface according to the invention discussed above, related to subscribing to channels and filtering, a preferred implementation of the invention includes an interface defined in terms of a commonly known interface paradigm usually applied to audio devices such as compact disc players or tape recorders. Play, pause, rewind, fast-forward and other similar tasks are provided, preferably by means of mouse click buttons in a graphical user interface. Also, a set of new features is introduced. A user can play the clips in reverse or repeat them more than once.

2. MAPPING DIFFERENT SOUNDS TO DIFFERENT INFORMATION

As discussed above, audio clips being played may be headed and ended with Prelude and Postlude sounds, such as fanfares, chimes, etc. Also a background sound, played concurrently with the information, is provided and can be changed or turned off. Preferably, a plurality of such sounds are available, and a flexible triggering mechanism is supplied, which plays back such sounds based on the content of the information items. The user maps sounds to information by channel or filter, preferably during the process of FIG. 6.

Accordingly, when an information item occurs, which has been suitably flagged by the user, the user is notified by an audio icon he/she has chosen for that information, and which he/she recognizes as such. For instance, if a specified stock suddenly drops its value by a specified amount, the user hears a warning sound of a siren selected for use when an information item occurs from the stock channel, filtered by the stock name and the amount of the price drop.

3. SOUND PLAYBACK MODES FOR REPETITIVE MESSAGES

It will often be the case that a particular desired information item is an item which will, from time to time, be updated in value, status, etc. For instance, desired information might include changes in the price of a stock. Such changes will only occur during a time interval while the stock market is open. While the market is open, however, a series of price fluctuations may take place. Then, a final price will stand at the close of the stock market's session.

For another example, messages might be desired regarding the score of a baseball game in progress. A first message is given when the first team scores. Subsequent messages will be given as further scoring takes place. Then, when the game ends, a final score will be given.

In either instance, a succession of messages, all using the same prelude, postlude, or background might become undesirably repetitive to the user. To give the user an opportunity to accommodate his/her particular tasks in such situations, an audio ticker playing mode selection is provided. Two modes are as follows:

(a) Play once: some users do not like to hear the audio get repeatedly played, so a "play once" option may be selected. The audio gets played only once when the information is received from the push server. For instance, the first stock price quote of the day might be accompanied by the familiar bell ringing used to open and close sessions of the New York Stock Exchange. Once the first price quote has been given, with the bell sound, subsequent stock price quotes omit the bell.

In the baseball example, the opening score could be accompanied by, for instance, a segment of "Take Me Out To The Ball Game," to draw the user's attention to the fact that the item pertains to a baseball game which is beginning. Subsequent scores could omit the tune. The same tune, or a different sound, could be used to signal the final score. An additional option could be that different sounds are used depending on the content of the token. For example, different sounds could be used for the report of the final score, depending on the outcome of the game. For instance, if the user's home team wins, the final score could be accompanied by a clip chosen to convey victory, such as a clip of "Happy Days Are Here Again."

(b) Play when updated: some users want to hear a ticker item whenever its content is updated from its last value. For example, if the user listens to the stock channel of the audio ticker and there are 20 stocks in the channel. The ticker will play the stock whose value have been updated since the last time the value was received from the push server.

4. VOICE OTHER THAN A TRANSCRIPT OF THE INFORMATION ITEM

The discussion above has focused on providing a substantially word-for-word voice representation of the content of an information token. For instance, if an information token from a weather channel indicates that it will rain later that day, the voice clips played for the user give merely a statement that rain is coming.

However, it is also possible to include audio clips in the library 16 (or the server library 22) which give other information which, in some suitable way, follows from the information in the token. For instance, if an information token from a weather channel indicates that it will rain later that day, the voice clips played for the user could include a directive to the user to take an umbrella and a raincoat, in addition to (or in place of) the statement that rain is coming.

5. SOUND CONTENT OTHER THAN VOICE

Where the information items include text tokens such as stock quotes received from the push server, voice is sufficient to communicate the message to the user. Other sounds, such as preludes, postludes, and background, as described above, are used to attract the user's attention, rather than to convey additional content.

However, with the current trend of fast growing amount of audio data on the cyberspace, the audio ticker design is also extended to take advantage of such information resources. Therefore, an audio ticker channel can contain audio clips such as sports highlights, speeches, music, etc.

6. USING THE USER'S CLIENT SYSTEM AS AN INFORMATION SOURCE

Information resources may originate, not only from the push server, but also from the user's personal computer. Where the client 8 is supported by a platform of a general purpose computer, or the like, the computer may also concurrently run another application program which handles information that can be conveyed to the user as audio signals. That application program may then be treated as another information channel, in a manner generally equivalent to the way in which the system of the invention treats the external or remote information channels.

For example, the audio ticker can have a reminder channel that plays the entries of the user's calendar. A meeting scheduled on the user's on-line calendar utility generates an information token which is provided to the mapper 14, the message saying "you have a meeting at 10 o'clock", "your phone bill is due today", etc.

7. "PERSONAL RADIO": COMBINING INFORMATION MESSAGES WITH ONGOING BACKGROUND SOUNDS

Conventional machines which can serve as the client system 8, such as IBM Corporation's Dock II docking station for use with a ThinkPad laptop computer, provide audio playback capability, such as a CD-ROM drive with an audio CD driver application. Other systems have the capability of playing back broadcast audio, such as music from radio stations.

Such a novel user interface may be characterized as a "personal radio." Thus, business-related information, such as the audio clips discussed above, may be integrated with entertainment, such as one's favorite music. Alternatively, a company or product theme song or jingle may be used as a background while stock quotes are being played, thus providing an integrated advertising sound presentation.

8. USE WITH PORTABLE DEVICES

A class of portable information tools has appeared on the market in recent years. These tools include cordless cellular telephones, laptop computers, "personal digital assistant" devices, etc. Many of such devices have interfaces for accepting downloaded information for later, stand-alone use by the user. An increasing number of such devices also have audio playback capabilities.

A system according to the invention may advantageously be used with such portable devices. Audio information produced by a system according to the invention, such as voice messages with preludes, etc., may be downloaded onto these portable devices.

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A system for providing a user with desired information, the system comprising:
    a unit including a video display mechanism and an audio play mechanism;
    means for displaying first information using the video display mechanism;
    a library of prerecorded voice clips;
    means for receiving information indicating which of the prerecorded voice clips to use to form second information; and
    means for playing the second information using the audio play mechanism.

2. A system as recited in claim 1,
    wherein the system includes a client and a server; and
    the library of prerecorded voice clips, the means for receiving, and the means for playing are resident on the client.

3. A system as recited in claim 2, wherein:
    the client includes means for determining that the library does not contain a voice clip which corresponds with the second information;
    the server includes a second library of prerecorded voice clips and means, operable responsive to a request from a client, for identifying which prerecorded voice clip of the second library corresponds with the second information and for responding to the request by downloading the identified prerecorded voice clip; and
    the client includes means, responsive to failure to find a prerecorded voice clip which corresponds with the second information, for sending a request to the server.

4. A system as recited in claim 1, further comprising means for playing one of (i) a prelude, (ii) a postlude, and (iii) a background audio, along with the second information.

5. A system as recited in claim 4, further comprising:
    a library of prelude/postlude/background sounds; and
    means for allowing a user to preselect a desired sound, from the library of prelude/postlude/background sounds, as one of (i) the prelude, (ii) the postlude, and (iii) the background.

6. A system as recited in claim 5, wherein:
    the means for allowing a user to preselect a desired sound is operable on a per information item basis;
    a succession of messages related to a given information item are anticipated to be received over time; and
    the system further comprises means for allowing the user to choose selective playback of one of (i) the prelude, (ii) the postlude, and (iii) the background preselected for messages related to that information item.

7. A system as recited in claim 1, wherein the system further comprises:
    means for receiving second information messages, and
    means for determining, based on preprogrammed user interest criteria, whether a given one of the second information messages is of interest to the user; and
    the means for playing the second information includes determination, by the means for determining, that the given second information message is of interest to the user.

8. A system as recited in claim 7, wherein the means for determining whether a given one of the second information messages is of interest to the user includes means for allowing the user to preprogram what information is of interest.

9. A system s recited in claim 8, further comprising:
means for maintaining and displaying a menu of channels of information; and
means for allowing the user to select and deselect channels from the menu.

10. A system as recited in claim 9, further comprising means for allowing the user to filter information from a selected channel according to a filtering criterion, so that the user receives only information from the channel which satisfies the filtering criterion.

11. A system as recited in claim 1, further comprising:
a second source for information to be played back as audio signals; and
means for playing audio signals from the second source along with the second information.

12. A system as recited in claim 11, wherein:
the system further includes an application program; and
the second source for information to be played back as audio signals includes the application program.

13. A system as recited in claim 1, wherein the received information includes a plurality of tokens, each of the tokens being smaller than the prerecorded voice clip that the token indicates.

14. A system as recited in claim 1, wherein the received information includes a plurality of tokens, at least some of the tokens indicating a prerecorded voice clip of one word length.

15. A system as recited in claim 14, wherein the received information includes a plurality of tokens, at least some of the tokens indicating a prerecorded voice clip of multiple word length.

16. A system as recited in claim 1, wherein the received information includes a plurality of tokens, at least some of the tokens indicating a prerecorded voice clip of multiple word length.

17. A method for providing a user with desired information, the user employing a client computer system including a unit having a video display mechanism and an audio play mechanism, the method comprising the steps of:
displaying first information using the video display mechanism;
storing a library of prerecorded voice clips on the client system;
receiving information indicating which of the prerecorded voice clips to use to form second information; and
playing the second information using the audio play mechanism.

18. A method as recited in claim 17, further comprising the steps of:
coupling the client system to a server; and
forming the second information based on the received information,
wherein the steps of forming and playing are executed by the client system.

19. A method as recited in claim 18, wherein:
the method further includes the step, executed by the client, of determining if the library does not contain a voice clip which corresponds with the second information;
the server includes a second library of prerecorded voice clips and means, operable responsive to a request from the client system, for identifying which prerecorded voice clip of the second library corresponds with the second information and for responding to the request by downloading the identified prerecorded voice clip; and
the method further includes the step, executed by the client system responsive to failure of the forming step, of sending a request to the server.

20. A method as recited in claim 17, further comprising the step of playing one of (i) a prelude, (ii) a postlude, and (iii) a background audio, along with the second information.

21. A method as recited in claim 20, wherein:
the client system further includes a library of prelude/postlude/background sounds; and
the method further comprises the step of allowing a user to preselect a desired sound, from the library of prelude/postlude/background sounds, as one of (i) the prelude, (ii) the postlude, and (iii) the background.

22. A method as recited in claim 21, wherein:
the step of allowing a user to preselect a desired sound is operable on a per information item basis;
a succession of messages related to a given information item are anticipated to be received over time; and
the method further comprises the step of allowing the user to choose selective playback of one of (i) the prelude, (ii) the postlude, and (iii) the background preselected for messages related to that information item.

23. A method as recited in claim 17 wherein:
the method further comprises the steps of:
receiving second information messages, and
determining, based on preprogrammed user interest criteria, whether a given one of the second information messages is of interest to the user, and
the step of playing the second information includes determination, by the step of determining, that the given second information message is of interest to the user.

24. A method as recited in claim 23, wherein the step of determining whether a given one of the second information messages is of interest to the user includes allowing the user to preprogram what information is of interest.

25. A method s recited in claim 24, further comprising the steps of:
maintaining and displaying a menu of channels of information; and
allowing the user to select and deselect channels from the menu.

26. A method as recited in claim 25, further comprising the step of allowing the user to filter information from a selected channel according to a filtering criterion, so that the user receives only information from the channel which satisfies the filtering criterion.

27. A method as recited in claim 17, wherein:
the client system includes a second source for information to be played back as audio signals; and
the method further comprises the step of playing audio signals from the second source along with the second information.

28. A method as recited in claim 27, wherein:
the client system further includes an application program; and
the second source for information to be played back as audio signals includes the application program.

29. A method as recited in claim 17, wherein the received information includes a plurality of tokens, each of the tokens being smaller than the prerecorded voice clip that the token indicates.

30. A method as recited in claim 17, wherein the received information includes a plurality of tokens, at least some of the tokens indicating a prerecorded voice clip of one word length.

31. A method as recited in claim 30, wherein the received information includes a plurality of tokens, at least some of the tokens indicating a prerecorded voice clip of multiple word length.

32. A method as recited in claim 17, wherein the received information includes a plurality of tokens, at least some of the tokens indicating a prerecorded voice clip of multiple word length.

33. A machine-readable medium encoded with a computer program, for use with a client computer system, for providing a user with desired information, the client computer system including a library of prerecorded voice clips and a unit having a video display mechanism and an audio play mechanism, the computer program comprising:

means for directing the client system to display first information using the video display mechanism;

means for receiving information indicating which of the prerecorded voice clips to use to form second information; and means for directing the client system to play the second information using the audio play mechanism.

34. A machine-readable medium as recited in claim 33, wherein the client system is coupled to a server, and the computer program further includes means for forming the second information based on the received information.

35. A machine-readable medium as recited in claim 34, wherein:

the computer program further includes means for directing the client system to determine if the library does not contain a voice clip which corresponds with the second information;

the server includes a second library of prerecorded voice clips and means, operable responsive to a request from the client system, for identifying which prerecorded voice clip of the second library corresponds with the second information and for responding to the request by downloading the identified prerecorded voice clip; and the computer program further includes means for directing the client system, responsive to failure of the means for forming, to send a request to the server.

36. A machine-readable medium as recited in claim 33, wherein the computer program further includes means for directing the client system to play one of (i) a prelude, (ii) a postlude, and (iii) a background audio, along with the second information.

37. A machine-readable medium as recited in claim 36, wherein:

the client system further includes a library of prelude/postlude/background sounds; and the computer program further comprises means for directing the client system to allow a user to preselect a desired sound, from the library of prelude/postlude/background sounds, as one of (i) the prelude, (ii) the postlude, and (iii) the background.

38. A machine-readable medium as recited in claim 37, wherein:

the means for directing to allow a user to preselect a desired sound is operable on a per information item basis;

a succession of messages related to a given information item are anticipated to be received over time; and the computer program further comprises means for directing the client system to allow the user to choose selective playback of one of (i) the prelude, (ii) the postlude, and (iii) the background preselected for messages related to that information item.

39. A machine-readable medium as recited in claim 33 wherein the computer program further comprises:

means for directing the client system to receive second information messages, and means for directing the client system to determine, based on preprogrammed user interest criteria, whether a given one of the second information messages is of interest to the user, and the means for directing the client system to play the second information includes determination, by the means for directing to determine, that the given second information message is of interest to the user.

40. A machine-readable medium as recited in claim 39, wherein the means for directing to determine whether a given one of the second information messages is of interest to the user includes means for directing the client system to allow the user to preprogram what information is of interest.

41. A machine-readable medium as recited in claim 40, wherein the computer program further comprises:

means for directing the client system to maintain and display a menu of channels of information; and means for directing the client system to allow the user to select and deselect channels from the menu.

42. A machine-readable medium as recited in claim 41, wherein the computer program further comprises means for directing the client system to allow the user to filter information from a selected channel according to a filtering criterion, so that the user receives only information from the channel which satisfies the filtering criterion.

43. A machine-readable medium as recited in claim 33, wherein:

the client system includes a second source for information to be played back as audio signals; and the computer program further comprises means for directing the client system to play audio signals from the second source along with the second information.

44. A machine-readable medium as recited in claim 43, wherein:

the client system further includes an application program; and the second source for information to be played back as audio signals includes the application program.

45. A machine-readable medium as recited in claim 33, wherein the received information includes a plurality of tokens, each of the tokens being smaller than the prerecorded voice clip that the token indicates.

46. A machine-readable medium as recited in claim 33, wherein the received information includes a plurality of tokens, at least some of the tokens indicating a prerecorded voice clip of one word length.

47. A machine-readable medium as recited in claim 46, wherein the received information includes a plurality of tokens, at least some of the tokens indicating a prerecorded voice clip of multiple word length.

48. A machine-readable medium as recited in claim 33, wherein the received information includes a plurality of tokens, at least some of the tokens indicating a prerecorded voice clip of multiple word length.

* * * * *